UNITED STATES PATENT OFFICE.

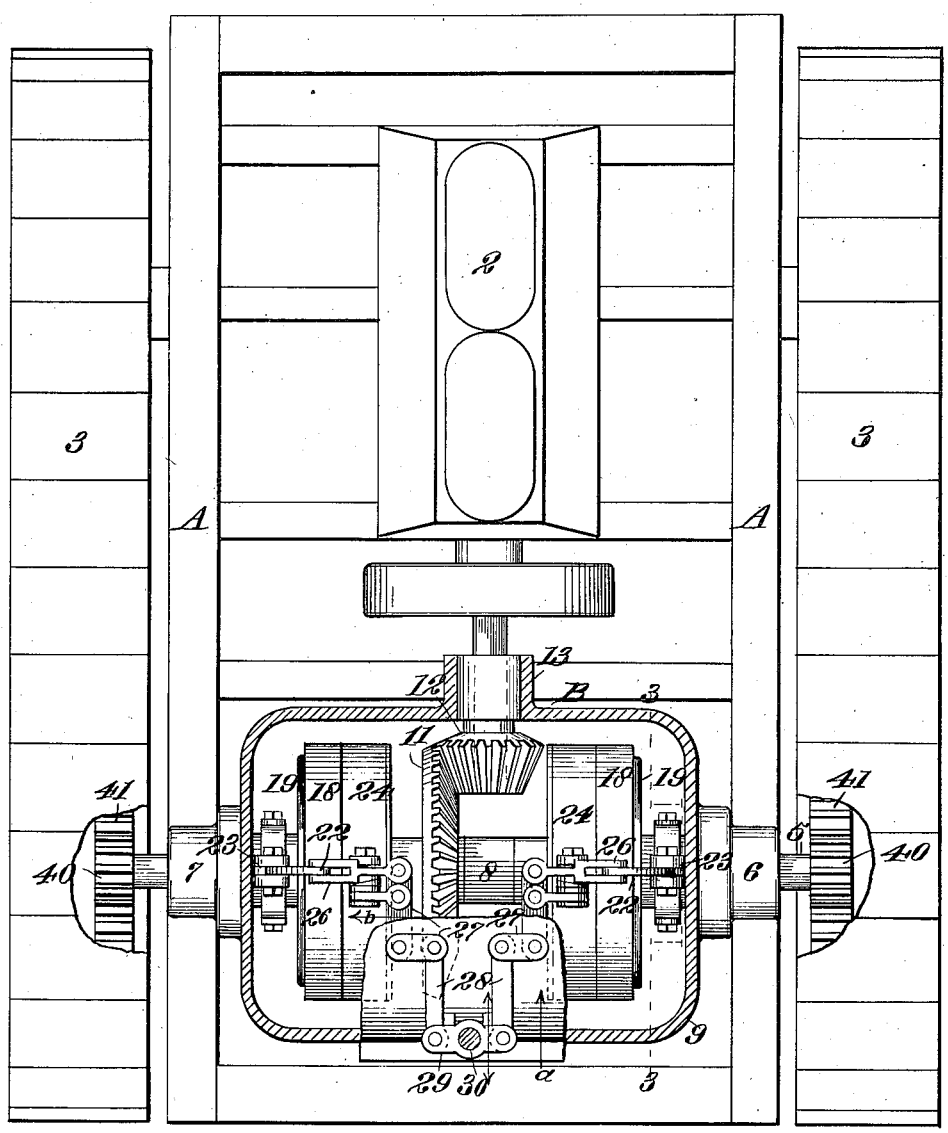

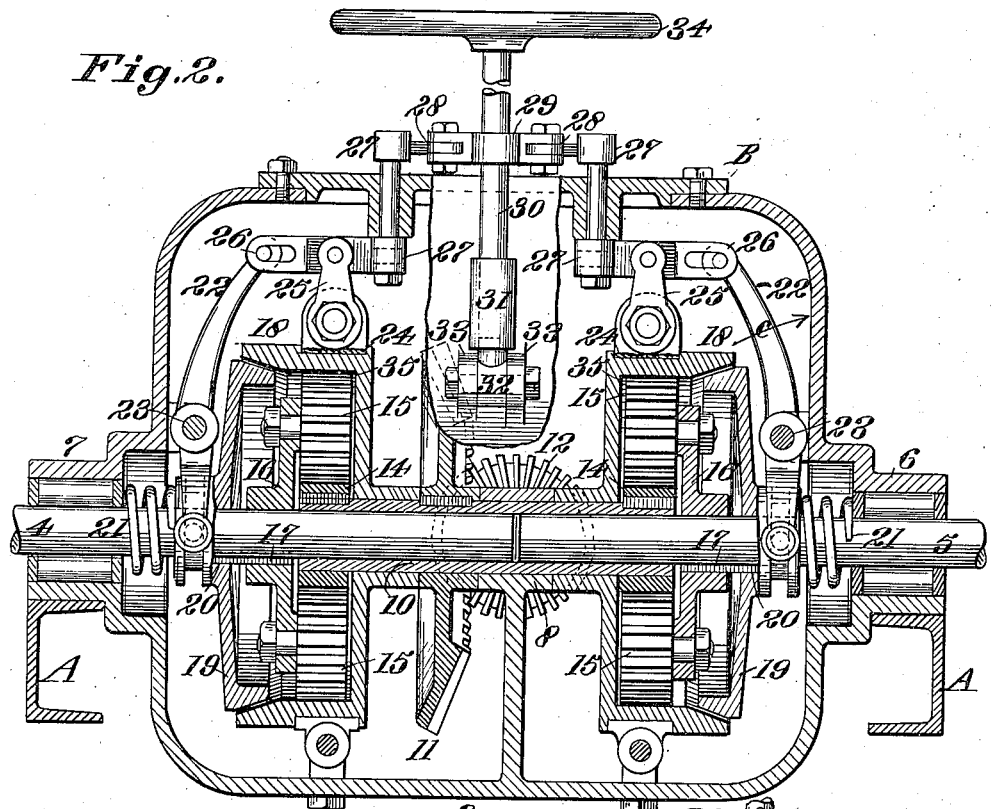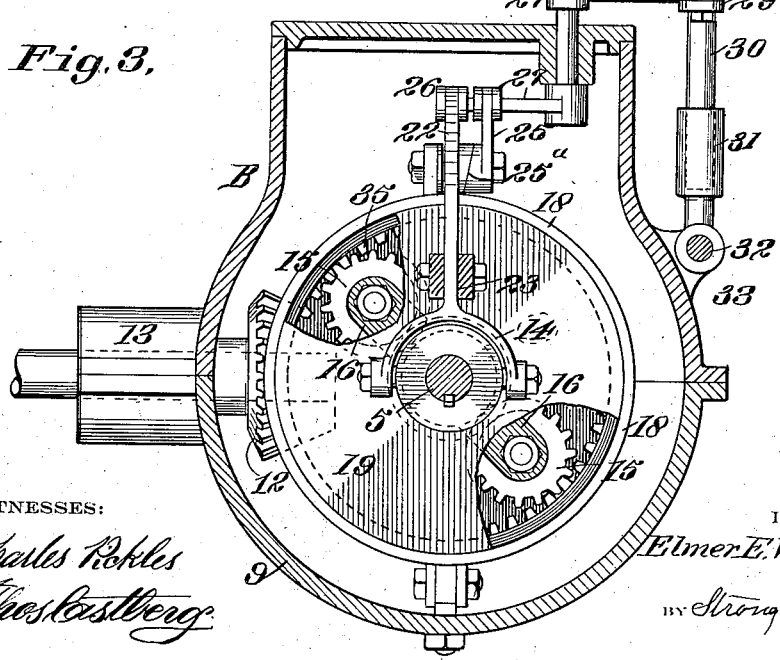

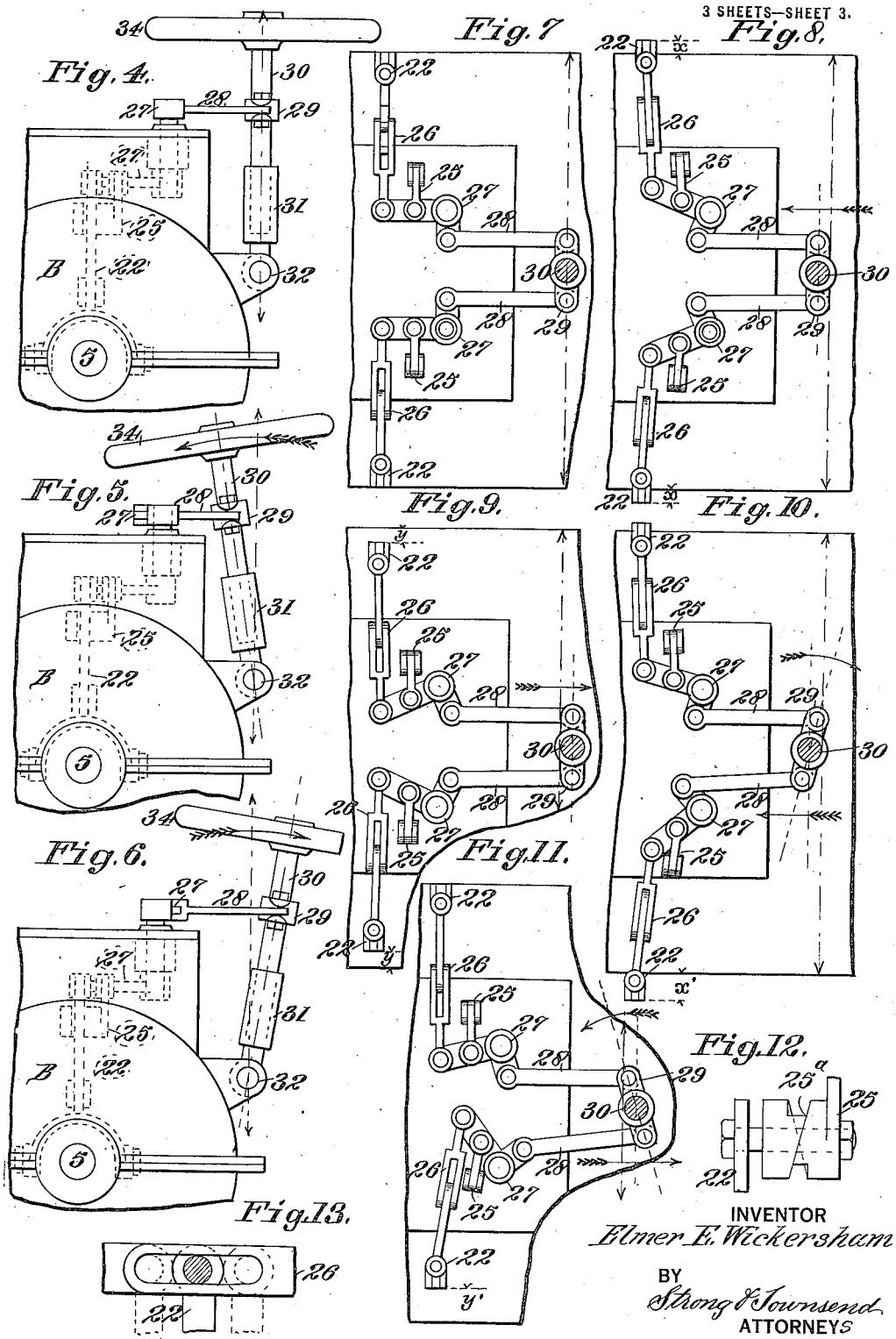

ELMER E. WICKERSHAM, OF OAKLAND, CALIFORNIA, ASSIGNOR TO THE HOLT MANUFACTURING COMPANY, OF STOCKTON, CALIFORNIA, A CORPORATION OF CALIFORNIA.

TRANSMISSION MECHANISM.

1,386,979.          Specification of Letters Patent.      Patented Aug. 9, 1921.

Application filed August 16, 1915, Serial No. 45,638. Renewed January 12, 1921. Serial No. 436,825.

*To all whom it may concern:*

Be it known that I, ELMER E. WICKERSHAM, a citizen of the United States, residing at Oakland, in the county of Alameda and State of California, have invented a new and useful Improvement in Transmission Mechanism, of which the following is a specification.

This invention relates to a transmission mechanism.

One of the objects of the present invention is to provide a steering gear transmission mechanism of the planetary type which is particularly adapted for use on traction engines of the self-laying track type and which is so constructed that power may be transmitted from the engine shaft to a pair of drive shafts in such a manner that both shafts may drive ahead, or run free in unison, or drive ahead, under variable speeds, or run free independently of each other. Another object of the invention is to provide a single controlling means by which said operations may be effected. Further objects will appear hereinafter.

The invention consists of the parts and the combination and construction of parts as hereinafter more fully described and claimed, having reference to the accompanying drawings, in which—

Figure 1 is a plan view of a traction engine of the self-laying track type showing the application of the invention.

Fig. 2 is an end view of the transmission partly in section.

Fig. 3 is a cross-section on line 3—3 of Fig. 1.

Figs. 4, 5, and 6 show side elevations of the steering post in different positions of fore and aft adjustment.

Figs. 7, 8 and 9 show plan sections of the same in different positions of fore and aft adjustment, the wheel being in intermediate position.

Fig. 10 shows a plan section of the post in the position indicated in Fig. 5 with the wheel turned to the right.

Fig. 11 shows a plan section of the post in the position indicated in Fig. 6 with the wheel turned to the left.

Fig. 12 shows a detail of the cam mechanism for actuating the brake band on the planetary gear.

Fig. 13 shows a detail of the sliding connection between the clutch shifting lever fork and its actuating link.

Referring to the drawings in detail, A indicates the main frame of a traction engine; 2 the engine, and 3 the self-laying tracks by which the engine is propelled and to which power is transmitted from the engine through means of the transmission mechanism, generally indicated at B. This is accomplished in the following manner:

4—5 indicate a pair of drive shafts positioned crosswise of the main frame and journaled in bearings 6—7—8, formed within a casing 9, which incloses the transmission as a whole. Surrounding the drive shaft 4—5 is a tubular shaft 10 upon which is secured a beveled gear 11, to which power is transmitted from a driving pinion 12 secured on the end of the engine shaft, which in this instance, extends into the transmission case, being supported therein by a journal box 13. Secured on each end of the tubular shaft 10 is a spur gear pinion 14, each adapted to transmit power to a plurality of intermediate pinions 15 journaled in and carried by a spider web 16, of which there are two; one being secured on each drive shaft 4—5, by means of a key 17.

Loosely mounted on the tubular shaft 10 is a pair of clutch members 18, one on each side of the center bearing 8, and coöperating with each clutch member 18 is a cone clutch 19, which is keyed to and slidably mounted on each shaft 4—5, as indicated at 20. The cone clutches 19 are normally held in engagement with the coöperating clutches 18 by means of coil springs 21, interposed between the bearings 6—7 and the cone clutches 19, but are adapted to be thrown out of engagement with clutches 18 by means of a pair of levers 22, which are pivotally mounted as at 23, interior of the casing 9. Surrounding each clutch member 18 is a brake band 24, each of which is adapted to be tightened or released by means of levers 25, which coöperate with levers 22 through means of connecting links 26, each of which is operated by means of an independent bell crank 27 and links 28, connected with a cross arm 29, secured on a pivotally and turnably mounted post 30. The pivotal and turnable mounting of post 30 is accomplished by providing a socket member 31 which is pivotally mounted, as at 32, on the main casing 9 between lugs 33

This permits the post as a whole to be moved either forward or backward in the direction of the arrows, see Fig. 1, or to be turned about its axis within the socket member 31 by providing a hand-wheel 34 on the upper end of the post.

The post 30 with connected links and clutches is provided for the purpose of controlling the transmission of power from the engine shaft to the driving shafts, and forms a single means by which the different operations are effected. This is accomplished in the following manner:

If it is desired to transmit a forward drive to the endless tracks 3, it is accomplished by throwing the steering post forward in the direction of arrow a. This movement is transmitted through the cross-arm 29 and links 28 to swing the bell cranks in the direction of arrows b, and this movement is in turn transmitted through links 26, thus permitting springs 21 to force said clutches inwardly, or into engagement with the adjacent or coöperating clutch members 18. The power will then be transmitted through pinion 12 and gear 11 to the tubular shaft 10, then through each spur pinion 14 and intermeshing intermediate gears 15, to an internal gear 35, formed interiorly of each clutch member 18, then through the connecting clutches 18—19 to each drive shaft 4—5, as clutches 19 are keyed one to each shaft.

If it is desired to turn the tractor in a right-hand direction, see Fig. 1, it can be accomplished in two manners; either by freeing the right-hand drive, which connects with the right-hand track 3 when it is desired to make a short turn, or if it is desired to make a long turn, to transmit a reduced speed drive to the right-hand track 3. The freeing of the right-hand drive is accomplished by turning the hand-wheel 34 in a right-hand direction. This causes the connected bell crank 27 to move in the direction opposite to arrow b and consequently throw clutch 19 on the right-hand side out of engagement with coöperating clutch 18. No power will then be transmitted through shaft 5 and connected track 3, as clutches 18—19 have been thrown out of engagement and the clutch member 18 is running free with respect to its brake band.

If it is desired to reduce the speed of the right-hand track 3, it is accomplished by turning the hand-wheel still further in the right-hand direction. This causes bell-crank 27 to move arm 25 on the right-hand side so far that the cam face 25ª formed on the lower end of said lever will tighten a band brake surrounding the connected clutch 18 and lock this against turning movement. The revolving movement of the tubular shaft 10 and spur gears 14 will then transmit power through the intermediates 15, causing these to turn the spider web 16, which is keyed, as at 17 to shaft 5, in this manner transmitting a reduced speed to shaft 5, which in turn is transmitted through pinion 40 to the main driving gear 41, which operates the connected track 3.

If it is desired to turn the tractor to the left-hand side, the same cycle of operation is performed, only that the turning movement of the hand-wheel 34 is reversed.

In this manner it is possible to transmit a forward drive to both tracks in unison, or a reduced speed drive to either track.

It is also possible to permit the forward driving gears to run idle when clutches 19 are thrown out of engagement, or to drive ahead, independently of each other under variable speeds; the different operations being effected by the rocking of the steering post about the pivot 32, or on turning same by means of the hand-wheel 34 with connected post in socket 31.

In this manner it is possible to do away with the front steering wheel, now commonly employed in the majority of tractors, as the provision of the clutches and connected brake bands 24 permits any desired speed to be transmitted to either track.

It also eliminates the differential connections, thereby reducing cost of construction and simplifying the construction in general.

If the steering post be moved fully forward without turning, both clutches will be engaged and the tractor will move forwardly in a straight course at high speed, while if the post be moved backwardly as far as possible, both clutches will be disengaged and both brake-bands will be applied, thus bringing the spiders 16 into operation and driving both tracks forwardly in unison at a reduced speed. If the post be left midway between the above mentioned positions, both clutches will be disengaged and both brake-bands will be released, thus placing the mechanism in a neutral position, in which case neither one of the tracks will be driven. Also if at any one of the foregoing positions, the steering post be turned to the right or left, the tractor will be driven forwardly in a curved course varying in radius according to the relative speeds of the two tracks.

To enable a better understanding to be had of the operation of the control mechanism, reference is made to Sheet 3 of the drawings wherein the three fore and aft positions of the steering post are shown.

Figs. 4 and 7 represent the neutral position wherein both clutches and brake-bands will be disengaged.

Figs. 5 and 8 show the steering post moved forwardly in which position both clutches will be engaged and the tractor will be driven forwardly at high speed.

Figs. 6 and 9 show the steering post moved rearwardly in which position the clutches will be both disengaged and the brake-bands on the planetary gears will both be set so as to cause the tractor to be driven forwardly at a reduced speed through the medium of the pinions 15 and spiders 16.

In Fig. 10 the post is in position where the clutches are engaged but the wheel is shown as having been turned to the right so as to cause disengagement of one of the clutches, resulting in a turning of the tractor to the right.

In Fig. 11 the post is in position where the two clutches are disengaged and a low speed drive is being effected by reason of the setting of the brakes upon the planetary gears. In this view the wheel is shown as having been turned to the left so as to release the brake-band on the righthand side for the purpose of negotiating a turn to the left.

The mechanism embodied in this disclosure is simple, strong, practical, highly efficient and compact, so that it may be applied to a tractor of the self-lay-track type and particularly those which have no front steering wheel but are steered through the tracks and it is designed to meet the unusual conditions present in such tractors. Of course the mechanism is not limited in its application to any particular purpose, as it may be used for many purposes. It will be noted that the drive shafts are located within the engine driven tubular shaft, which provides a transmission mechanism structure of the simplest, strongest and most compact type. In this structure a transmission clutch of the planetary gear type is very successfully employed, and when the clutch is thrown into or out of operation, the gears always remain in mesh. This is a very important feature as it insures a positive and efficient operation of the transmission clutch.

Having thus described my invention what I claim and desire to secure by Letters Patent is—

1. In a transmission mechanism, an engine shaft, a pair of drive shafts, means permitting transmission of power from the engine shaft to the driving shafts so that both may be driven in unison or run free in unison, said transmission means including change speed mechanism whereby either shaft may be driven at a variable speed independently of the other or run free independently of the other.

2. In a transmission mechanism, an engine shaft, a tubular shaft, means for transmitting power from the engine shaft to revolve the tubular shaft, a pair of driving shafts interiorly of the tubular shaft, one driving shaft projecting from each end of the tubular shaft, means for transmitting power from the tubular shaft to drive both of the driving shafts in unison, and means for transmitting power from the tubular shaft to the driving shafts independently of each other.

3. In a transmission mechanism, an engine shaft, a tubular shaft, means for transmitting power from the engine shaft to revolve the tubular shaft, a pair of driving shafts interiorly of the tubular shaft, one driving shaft projecting from each end of the tubular shaft, means for transmitting power from the tubular shaft to drive both of the driving shafts in unison, means for transmitting power from the tubular shaft to the driving shafts independently of each other, and means for freeing either or both driving shafts with relation to the tubular shaft.

4. In a transmission mechanism, an engine shaft, a tubular shaft, means for transmitting power from the engine shaft to revolve the tubular shaft, a pair of driving shafts interiorly of the tubular shaft, one driving shaft projecting from each end of the tubular shaft, means for transmitting power from the tubular shaft to drive both of the driving shafts in unison, means for transmitting power from the tubular shaft to the driving shafts independently of each other, means for freeing either or both driving shafts with relation to the tubular shaft, and a single controlling means by which said operations are effected.

5. In a transmission mechanism, an engine shaft, a pair of drive shafts, means for transmitting power from the engine shaft to said driving shafts and a single controlling means, said controlling means comprising a pivotally mounted steering post, and connections between said steering post and said power transmitting means, said steering post being adapted to be swung on its pivot to cause said power transmitting means to transmit power to said drive shafts in unison, and said steering post being adapted to be turned to cause said power transmitting means to transmit power to drive one of said shafts independently of the other, and said steering post being adapted to be turned further to cause said power transmitting means to drive said driving shafts at relatively different speeds.

6. In a transmission mechanism, an engine shaft, a pair of drive shafts, means permitting transmission of power from the engine shaft to the driving shafts so that both may be driven in unison or run free in unison, means for transmitting power to the driving shafts so that either shaft may be driven at a variable speed independently of the other or run free independently of the other, and a single controlling means by which said operations are effected.

7. In a transmitting mechanism, an engine shaft, a pair of drive shafts, means for transmitting power from the engine shaft to said driving shafts, and a single controlling means for said power transmitting means comprising a pivotally mounted steering post and connections between said steering post and said power transmitting means, said steering post being adapted to be swung on its pivot to cause said power transmitting means to transmit power to drive said driving shafts in unison, and said steering post being adapted to be turned to cause said power transmitting means to transmit power to drive said driving shafts at different speeds.

8. In a transmission mechanism, an engine-driven shaft, a gear on said shaft, a drive shaft, a clutch one member of which is loosely mounted, a gear on said clutch member, intermediate pinions meshing with the gear on said shaft and with said gear on said clutch member, a spider keyed on said drive shaft and upon which said intermediate pinions are journaled, the second member of said clutch being also keyed on said drive shaft, and a brake for said first clutch member.

9. In a transmission mechanism, an engine driven tubular shaft, a driving shaft interiorly of said tubular shaft and projecting beyond the end of said tubular shaft, a gear on said tubular shaft, a clutch, one member of which is loosely mounted on said tubular shaft, a gear on said clutch member, a spider keyed on said drive shaft, a pinion meshing with the gear on said clutch member, and with the gear on said tubular shaft, said pinion being journaled on said spider, the other clutch member being also keyed on said drive shaft, and a brake for said first clutch member.

10. In a transmission mechanism, an engine driven shaft, a pair of gears on said shaft, a pair of drive shafts, a pair of clutches, one member of each of which is loosely mounted on one of said drive shafts, a gear on each of said clutch members, intermediate pinions meshing with the gear of each of said clutch members and with one of said gears on said engine driven shaft, the other clutch members of said clutches being keyed respectively to said drive shafts, a brake for said first clutch member of each of said clutches, means for throwing both or one of said clutches into operative position, or for throwing said brakes into operation.

11. In a transmission mechanism, an engine driven shaft, a pair of gears on said shaft, a pair of drive shafts, a pair of clutches, one member of each of said clutches being loosely mounted, a gear on each of said clutch members, intermediate pinions meshing with the gear of each of said clutch members and with one of said gears on said engine driven shaft, the other clutch members of said clutches being keyed respectively to said drive shafts, a brake for said first clutch member of each of said clutches, means for throwing said clutches into operative position or for throwing one of said clutches out of operation and its brake into operation.

12. In a transmission mechanism, an engine-driven shaft, a pair of gears on said shaft, a pair of drive shafts, a pair of clutches, one member of each of said clutches being loosely mounted, a gear on each of said clutch members, intermediate pinions meshing with the gear of each of said clutch members and with one of said gears on said engine-driven shaft, the other clutch members of said clutches being keyed respectively to said drive shafts, a brake for said first clutch member of each of said clutches, means for throwing both or one of said clutches into operative position, or for throwing one or both of said clutches into or out of operation and their brakes out of or into operation.

13. In a traction engine the combination of a main frame carried on a pair of traction devices and transmission mechanism for the latter including disconnectible and change speed devices and a single element for controlling the latter whereby to steer the tractor and cause it to be driven forwardly at variable speeds.

14. In a traction engine the combination of a main frame carried on a pair of traction devices and transmission mechanism for the latter including disconnectible and change speed devices and a single element for controlling the latter whereby to steer the tractor and cause it to be driven forwardly at variable speeds, said transmission mechanism comprising a clutch mechanism and a planetary gear between each traction device and the driving member.

15. A vehicle steering gear mechanism comprising a transmission mechanism having a driving member and driven members, reducing gears and steering friction clutches, and a single controlling device to selectively operate said clutches or interpose said gears between the driving and driven members.

16. In a traction engine, a pair of alined driven shafts, a common driving means co-axial therewith for simultaneously actuating both of said shafts, and change speed transmission means affected thereby whereby differential rotation of the shafts will be produced in a single direction.

17. In a traction engine, a driving shaft, a pair of alined driven shafts, separate change speed transmission mechanisms for the two shafts and co-axial therewith, common driving means for said transmission, and a single control means whereby said transmissions may be separately affected to produce differential rotation of the shafts.

18. In a traction engine, a pair of alined driven shafts, common driving means for said shafts, separate change speed transmission means mounted around each of the shafts and actuated by the driving means, and control means whereby said transmissions may be caused to separately rotate the shafts at different speeds and in the same direction.

19. In a traction engine, a pair of alined driven shafts, changed speed transmission means for each of the shafts and co-axial therewith, a common driving means for the transmissions, and means whereby the transmissions may be affected to directly rotate the shafts in a single direction and at differential speeds.

In testimony whereof I have hereunto set my hand in the presence of two subscribing witnesses.

ELMER E. WICKERSHAM.

Witnesses:
JOHN H. HERRING,
F. C. COX.